L. S. BOLD.
TRACTION WHEEL.
APPLICATION FILED NOV. 18, 1916.
1,229,404. Patented June 12, 1917.
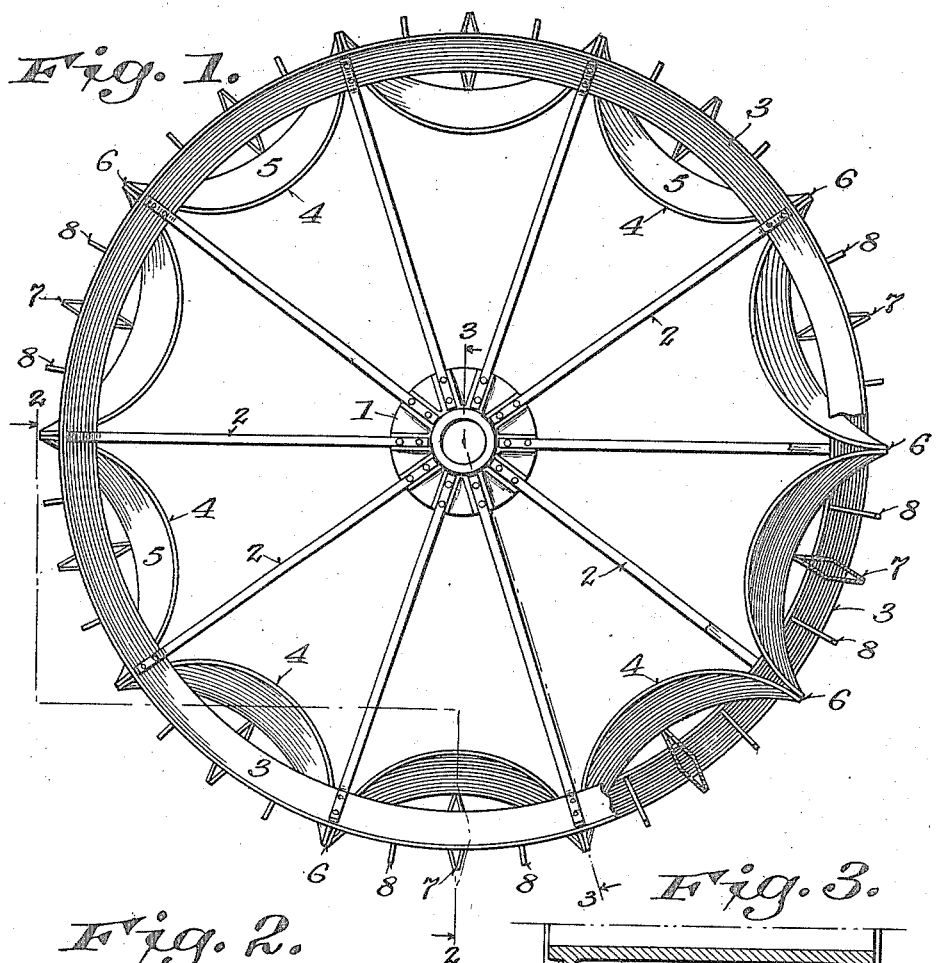
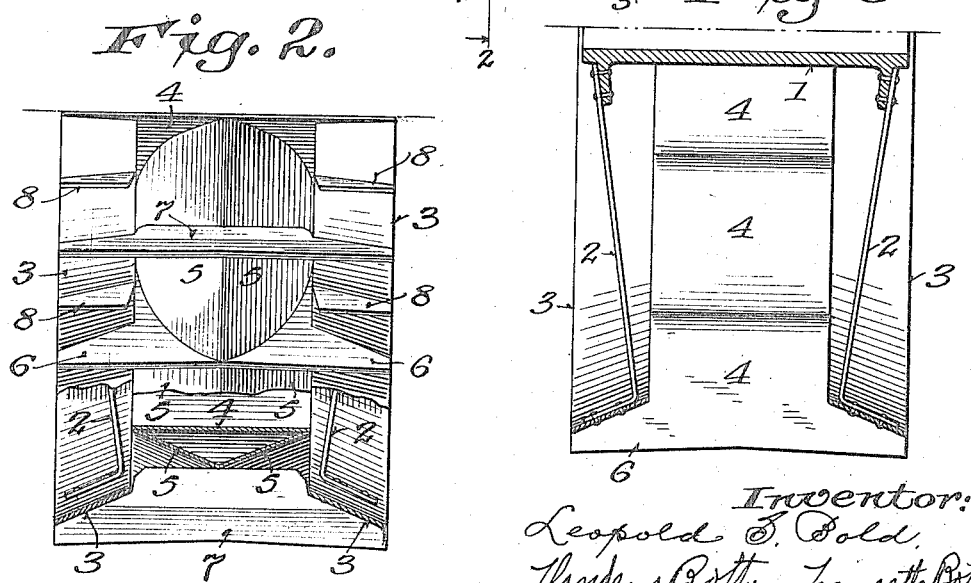
Inventor:
Leopold S. Bold,
By Flanders Bottum Fawsett & Bottum
Attorneys.

UNITED STATES PATENT OFFICE.

LEOPOLD S. BOLD, OF LA FARGE, WISCONSIN.

TRACTION-WHEEL.

1,229,404.　　　　Specification of Letters Patent.　　Patented June 12, 1917.

Application filed November 18, 1916. Serial No. 132,012.

*To all whom it may concern:*

Be it known that I, LEOPOLD S. BOLD, a citizen of the United States, residing at La Farge, in the county of Vernon and State of Wisconsin, have invented certain new and useful Improvements in Traction-Wheels, of which the following is a specification, reference being had to the accompanying drawing, forming a part thereof.

This invention relates more particularly to the treads of traction wheels for traction engines and the like.

Its main objects are to provide a wheel of this type which is adapted for use on both soft and hard ground; to shorten the radius in effect and thus increase the leverage and driving power of the wheel as it sinks into soft ground; and generally to improve the construction and operation of wheels of this class.

It consists in the peculiar construction, arrangement and combination of parts as hereinafter particularly described and pointed out in the following claims.

In the accompanying drawing like characters designate the same parts in the several figures.

Figure 1 is a side elevation of a traction wheel embodying the invention, a part of the tread being broken away; Fig. 2 is a section on the line 2—2, Fig. 1; and Fig. 3 is a section on the line 3—3, Fig. 1.

The wheel comprises a hub 1, and a web or spokes 2, which may be of the usual or any suitable construction.

The tread which constitutes the present invention, comprises a pair of inwardly converging spaced rims 3, which are attached in any suitable manner to the outer ends of the spokes 2. A series of inwardly concaved or reëntrant webs 4, are arranged around the periphery of the wheel between the rims 3, to which they are fastened in any suitable manner. These webs may be of curved, polygonal or angular construction, generally defined as hypocycloidal, to form a series of pockets or recesses, having inwardly converging walls transverse to the central plane of the wheel and to the rims 3. They are preferably formed or provided on their outer concave sides with inwardly and laterally diverging plates or faces 5, between the lateral edges of which and the inner edges of the rims 3, openings are left for the escape of mud or soft ground.

The webs 4 at their intersections or ends which project outwardly beyond the rims 3, are extended across the outer faces of said rims and form transverse wedge shaped cleats 6.

Midway between the cleats 6, similar wedge-shaped cleats 7 extend outwardly from the inner central portions of the webs 4 or of the diverging plates or faces 5 on their outer sides, transversely across the rims 3, and midway between the cleats 6 and 7, shorter cleats 8 are attached to and extend across the outer faces of said rims. The outer edges of all the cleats are preferably concaved or inclined slightly inward toward the central plane of the wheel, as shown in Figs. 2 and 3, so that they will bear only at or adjacent to their outer ends on rocky or very hard ground, or on concrete, macadamized or paved roads.

The cleats being disposed at short intervals around the periphery of the wheel, besides preventing the wheel from slipping and thus increasing its tractive power, avoid jolting in running over very hard ground or roads which do not allow the cleats to sink deep enough into them to give the wheel a bearing on the rims 3.

The wedge shape of the cleats 6 and 7 assist to pack the ground as they are forced into it, thus increasing its resistance against their slipping.

The wheel tread as shown, may be conveniently constructed in sections, of heavy sheet steel or metal plates, cut and pressed to the desired shape and form and bolted, riveted, welded or otherwise fastened together and to the web or spokes of the wheel.

In the operation of the wheel, in traveling on hard roads such as macadam, stone or brick paving, the wheel will bear only on the cross cleats 6, 7 and 8, and will run smoothly thereon without slipping or jolting, on account of the close spacing of the cleats and the inwardly concaved or inclined formation of their outer edges. In traveling over loose, compact ground, the cleats will sink into the ground and more or less of the rims 3 will be brought into contact therewith, according to the weight on the wheel and the compactness of the ground. In traveling over soft ground, such as sand or mud, the wheel will sink deeper and find a bearing between the rims 3 on the webs 4, or on their laterally inclined or diverging outer plates or faces 5. In very soft ground or mud, the softer and more fluid portions thereof will be crowded outwardly through the openings between the rims 3 and the webs 4, until the wheel finds a sufficiently firm and stable bearing. The rims 3 tend to crowd and pack the ground over which they pass, toward the central plane of the wheel in the path of the cleats. At the same time, the inwardly concaved or recessed webs 4 tend to compress the ground between the rims 3 in the direction of the plane of the wheel, or transversely to the compressing action of said rims, thereby providing a more firm and substantial bearing for the wheel, affording a better hold for the cross cleats and preventing the wheel from slipping or skidding.

The inwardly and laterally diverging plates or faces 5 of the webs and the openings between their lateral edges and the inner edges of the rims 3, allow the wheel to sink more readily in soft ground till harder ground is encountered, the action of the rims 3 and webs 4 converging toward the center of the wheel in planes transverse to one another, tending to compact the soft ground and thus produce a sufficiently stable bearing for the wheel and a firm hold for the cross cleats.

As the wheel sinks into the ground and bears more or less on the webs 4, which serve as an auxiliary or an additional tread therefor, its radius or leverage is in effect shortened, and its driving power is correspondingly increased, which is of great advantage in traveling over soft, unstable ground.

The inwardly and laterally diverging plates or faces of the webs 4 may be omitted, and various changes may be made in the details of construction and arrangement of parts of the wheel without departure from the principle and scope of the invention as defined in the following claims.

I claim:

1. In a traction wheel the combination of inwardly converging spaced rims provided with cross cleats and adapted to compact soft ground toward the central plane of the wheel, and a series of inwardly concaved webs between said rims adapted to compact ground between the rims transversely to the cleats.

2. In a traction wheel the combination of inwardly converging spaced rims and a series of hypocycloidal webs between the rims, the rims and webs adapted to compact soft ground on which the wheel bears in directions transverse to each other.

3. In a traction wheel the combination of inwardly converging spaced rims, and hypocycloidal webs between the rims, having on their outer sides faces diverging inwardly and laterally from the central plane of the wheel, lateral openings being left between the webs and rims for the escape of soft ground.

4. In a traction wheel the combination of a pair of inwardly converging spaced circular rims, a series of hypocycloidal webs located between the rims and forming at their intersections transverse cleats extending across and outwardly beyond the rims.

5. In a traction wheel the combination of a pair of inwardly converging spaced rims, a series of hypocycloidal webs located between the rims and forming at their intersections outwardly extending cleats across the treads of the rims, and transverse cleats extending outwardly from the central portions of the webs across the treads of the rims.

6. In a traction wheel the combination of a pair of inwardly converging spaced rims, a series of hypocycloidal webs located between the rims and forming at their ends transverse cleats extending across the treads of the webs and spanning the space between them, transverse cleats extending outwardly from the central portions of the webs across the webs of the rims, and shorter cleats extending outwardly from the rims midway between the other cleats.

7. In a traction wheel the combination of a pair of inwardly converging spaced circular rims, a circular series of hypocycloidal webs located between the rims and forming at their ends outwardly converging wedge-shaped cleats extending outwardly beyond and transversely across the treads of the rims, outwardly converging wedge-shaped cleats extending from the webs outwardly beyond and across the treads of the rims midway between the other cleats, and shorter cleats extending outwardly from and across the treads of the rims midway between the wedge-shaped cleats.

LEOPOLD S. BOLD.